(12) United States Patent
Deng et al.

(10) Patent No.: US 9,898,910 B2
(45) Date of Patent: Feb. 20, 2018

(54) SYSTEM AND METHOD FOR REMOTE MONITORING BASED ON LED LIGHTING DEVICE

(71) Applicant: SENGLED OPTOELECTRONICS CO., LTD., Tongxiang (CN)

(72) Inventors: Xingming Deng, Tongxiang (CN); Hui Wu, Tongxiang (CN); Chaoqun Sun, Tongxiang (CN); Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 0 days.

(21) Appl. No.: 14/899,075

(22) PCT Filed: Apr. 27, 2015

(86) PCT No.: PCT/CN2015/077519
§ 371 (c)(1),
(2) Date: Dec. 16, 2015

(87) PCT Pub. No.: WO2015/184939
PCT Pub. Date: Dec. 10, 2015

(65) Prior Publication Data
US 2016/0133105 A1    May 12, 2016

(30) Foreign Application Priority Data

Jun. 4, 2014    (CN) .......................... 2014 1 0247390

(51) Int. Cl.
*G08B 13/18* (2006.01)
*G08B 13/24* (2006.01)
(Continued)

(52) U.S. Cl.
CPC ..... *G08B 13/2494* (2013.01); *H05B 33/0854* (2013.01); *H05B 37/0272* (2013.01);
(Continued)

(58) Field of Classification Search
CPC ................................................. G08B 13/2494
(Continued)

(56) References Cited

U.S. PATENT DOCUMENTS

| 2013/0147899 A1* | 6/2013 | Labhard | G06F 19/3418 |
| | | | 348/14.03 |
| 2013/0216989 A1* | 8/2013 | Cuthbert | G09B 19/00 |
| | | | 434/238 |

(Continued)

FOREIGN PATENT DOCUMENTS

| CN | 202679759 U | 1/2013 |
| CN | 103716959 A | 4/2014 |
| CN | 104039045 A | 9/2014 |

OTHER PUBLICATIONS

The World Intellectual Property Organization (WIPO), International Search Report for PCT/CN2015/077519, dated Jul. 2, 2015.

*Primary Examiner* — Santiago Garcia
(74) *Attorney, Agent, or Firm* — Anova Law Group, PLLC

(57) ABSTRACT

A system for remote monitoring based on an LED lighting device is provided. The system includes a smart terminal configured to check regularly data and status of the LED lighting device stored in a cloud server and a wireless router configured to provide a wireless network. The LED lighting device includes a Wi-Fi module and a microwave sensor module, where the Wi-Fi module is configured to connect the LED lighting device to the wireless network, perform real-time data acquisition on the microwave sensor module, and upload the acquired data to the cloud server in real time; and the microwave sensor module is configured to detect object movement within an effective range. Further, the system includes the cloud server configured to receive information about an abnormal object moving within the (Continued)

effective range sent from the Wi-Fi module, and send the received information to the smart terminal.

16 Claims, 2 Drawing Sheets

(51) Int. Cl.
*H05B 37/02* (2006.01)
*H05B 33/08* (2006.01)
*H04W 84/12* (2009.01)
*H04W 84/18* (2009.01)

(52) U.S. Cl.
CPC ............ *H04W 84/12* (2013.01); *H04W 84/18* (2013.01); *Y02B 20/48* (2013.01)

(58) Field of Classification Search
USPC ........................................................ 340/552
See application file for complete search history.

(56) References Cited

U.S. PATENT DOCUMENTS

| | | | | |
|---|---|---|---|---|
| 2013/0285546 A1* | 10/2013 | Chen | ......................... | F21K 9/00 |
| | | | | 315/50 |
| 2015/0038165 A1* | 2/2015 | Tuo | ...................... | G01C 21/206 |
| | | | | 455/456.1 |
| 2016/0071389 A1* | 3/2016 | Sun | .................... | G08B 21/0208 |
| | | | | 340/539.15 |
| 2016/0171880 A1* | 6/2016 | Wu | ......................... | G05B 15/02 |
| | | | | 398/106 |
| 2016/0219447 A1* | 7/2016 | Chen | ..................... | H04W 40/12 |

* cited by examiner

SYSTEM AND METHOD FOR REMOTE MONITORING BASED ON LED LIGHTING DEVICE

CROSS-REFERENCES TO RELATED APPLICATIONS

This application is a national phase entry under 35 USC § 371(c) of PCT Application No. PCT/CN2015/077519, entitled "System and Method for Remote Monitoring Based on LED Lighting Device," filed on Apr. 27, 2015, which claims priority of Chinese Patent Application No. 201410247390.2, filed on Jun. 4, 2014, the entire contents of all of which are incorporated herein by reference.

FIELD OF THE INVENTION

The present disclosure generally relates to the field of light emitting diode (LED) lighting technology and wireless technology and, more particularly, relates to a system and method for remote monitoring based on an LED lighting device.

BACKGROUND

Wi-Fi technology is used to connect smart terminals (e.g., personal computers (PCs), smartphones, etc.) together wirelessly. LED lighting may generally provide advantages in various aspects of energy conservation, environmental protection, controllable lighting, solid-state lighting, and long operational lifetime. LED lamps thus have been widely used in various areas for public, commercial, and/or indoor lighting applications. The specific power supply and control method of the LED lighting device makes it easy to integrate the intelligent control and multimedia functions into LED lighting devices.

Currently, in a smart home environment, there is a demand for wireless and remote control of the home environment. However, in existing smart home products, wireless monitoring technology and LED lighting technology may not be well combined. An LED lighting/monitoring system that can implement wireless and remote monitoring functions often cannot be provided. Therefore, a remote smart home protection system may be implemented by integrating LED lighting functions with wireless and remote monitoring functions.

The disclosed LED systems and methods for remote monitoring based on an LED lighting device are directed to solve one or more problems set forth above and other problems.

BRIEF SUMMARY OF THE DISCLOSURE

One aspect of the present disclosure includes a system for remote monitoring based on a lighting emitting diode (LED) lighting device. The system includes a smart terminal configured to check regularly data and status of an LED lighting device stored in a cloud server and a wireless router configured to provide a wireless network. The system also includes the LED lighting device including a Wireless Fidelity (Wi-Fi) module and a microwave sensor module, where the Wi-Fi module is configured to connect the LED lighting device to the wireless network provided by the wireless router, perform real-time data acquisition on the microwave sensor module, and upload the acquired data to the cloud server in real time; and the microwave sensor module is configured to detect object movement within an effective range. Further, the system includes the cloud server configured to receive information about an abnormal object moving within the effective range sent from the Wi-Fi module, and send the received information to the smart terminal in real time.

Another aspect of the present disclosure includes a method for remote monitoring based on an LED lighting device. The method includes connecting an LED lighting device to a wireless network provided by a wireless router and performing real-time data acquisition on a microwave sensor module. The method also includes uploading the acquired data of the microwave sensor module to a cloud server in real time and checking data and status of the LED lighting device stored in the cloud server to monitor a home environment. Further, the method includes sending the received information to a smart terminal when information about an abnormal object moving within an effective range uploaded by a Wi-Fi module is received.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
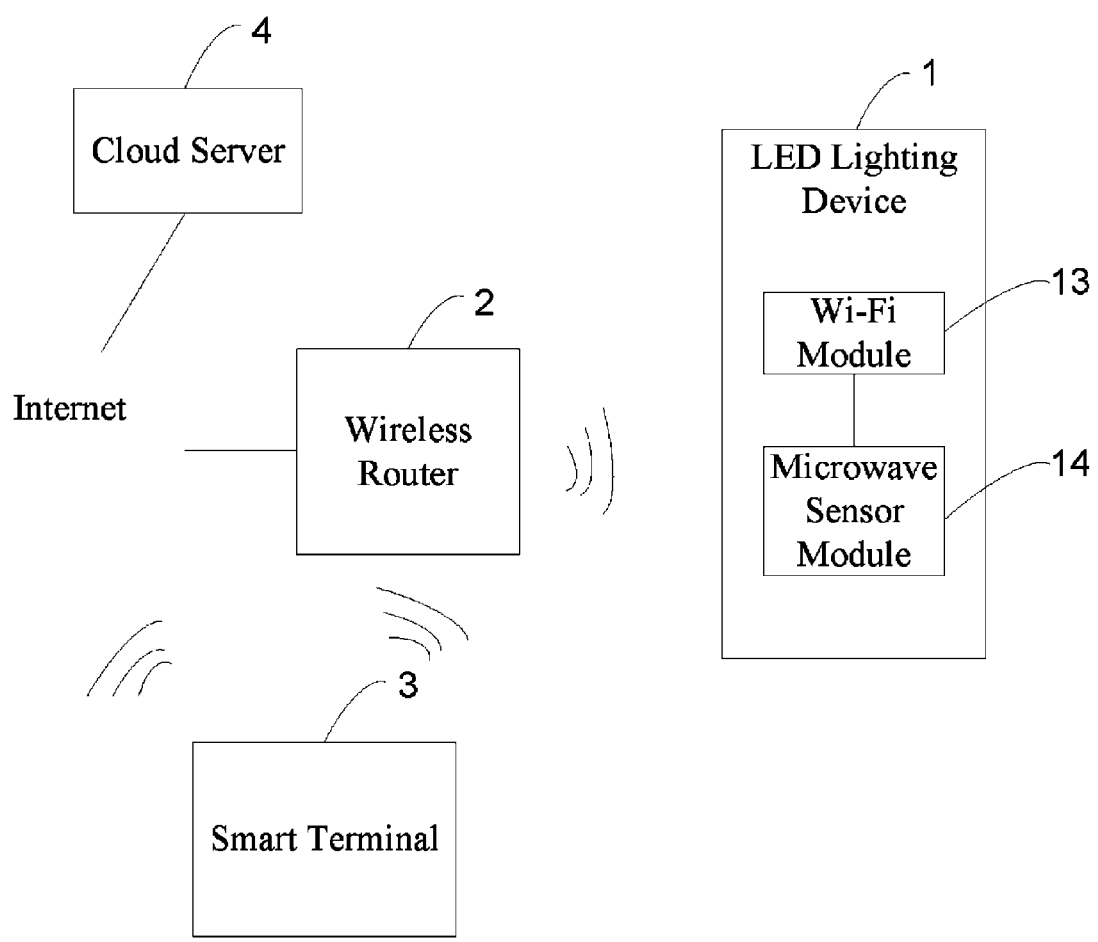
FIG. 1 illustrates a structure schematic diagram of an exemplary remote monitoring system based on an LED lighting device consistent with the disclosed embodiments.

FIG. 1 illustrates a structure schematic diagram of an exemplary remote monitoring system based on an LED lighting device consistent with the disclosed embodiments. As shown in FIG. 1, the remote monitoring system may include an LED lighting device 1, a wireless router 2, a smart terminal 3 and a cloud server 4, where a monitoring computer program is installed in the smart terminal 3, and a Wi-Fi module 13 and a microwave sensor module 14 are installed in the LED lighting device 1. Certain components or devices may be omitted and other components or devices may be included in embodiments consistent with the present disclosure.

The Wi-Fi module 13 and the microwave sensor module 14 are electrically connected. The microwave sensor module 14 is configured to detect object movements within an effective range. The Wi-Fi module 13 performs real-time data acquisitions on the microwave sensor module 14 through a one-channel Analog to Digital Converter (ADC). The Wi-Fi module 13 uploads the data of the microwave sensor module 14 in real time, and other data and status of the LED lighting device 1. In addition, when the Wi-Fi module 13 detects that there is an object moving within the effective range through the microwave sensor module 14, the Wi-Fi module 13 controls the LED lighting device 1 to giving a flashing alarm at a certain frequency or give an audible alarm through a horn embedded in or linked to the LED lighting device or outside the LED lighting device until the Wi-Fi module 13 detects that there is no object moving within the effective range. The object refers to any living or non-living object that can change locations in an effective range. For example, objects may include people (e.g., pedestrians), cars, bicycles, animals, etc.

The communication interface between the microwave sensor module 14 and the Wi-Fi module 13 may be ADC, Inter-Integrated Circuit (I2C), Universal Asynchronous Receiver Transmitter (UART) or General Purpose Input/Output (GPIO).

The smart terminal 3 may be directly connected to the wireless router 2. The smart terminal 3 may be also connected to the Internet through a mobile network (e.g., 2G, 3G or 4G communication network). When the smart terminal 3 is directly connected to the wireless router 2, the LED lighting device 1 accesses a wireless network provided by the wireless router 2 through the Wi-Fi module 13. At this point, the smart terminal 3 and the Wi-Fi module 13 are on the same network segment. The smart terminal 3 accesses the Internet through the wireless router 2. The Wi-Fi module 13 performs real-time data acquisition on the microwave sensor module 14 through a one-channel ADC. In addition, the Wi-Fi module 13 uploads the data of the microwave sensor module 14 in real time, and other data and status of the LED lighting device 1 to the cloud server 4. Through the Internet, an APP program in the smart terminal 3 checks regularly the data and status of the LED lighting device 1 stored in the cloud server 4. When the cloud server 4 receives information such as a message "there is an abnormal object moving within the effective range", the cloud server 4 sends the information to the smart terminal 3 in real time.

When the smart terminal 3 is connected to the Internet through the mobile network (e.g., 2G, 3G or 4G communication network), the wireless router 2 accesses the Internet, and the LED lighting device 1 accesses the wireless network provided by the wireless router 2 through the Wi-Fi module 13. The Wi-Fi module 13 performs real-time data acquisition on the microwave sensor module 14 through the one-channel ADC. In addition, the Wi-Fi module 13 uploads the data of the microwave sensor module 14 in real time, and other data and status of the LED lighting device 1 to the cloud server 4. Through the Internet, the APP program in the smart terminal 3 checks regularly the data and status of the LED lighting device 1 stored in the cloud server 4. When the cloud server 4 receives the information such as a message "there is an abnormal object moving within the effective range", the cloud server 4 sends the information to the smart terminal 3 in real time.

In addition, the LED lighting device 1 may be set to a microwave monitoring mode and a non-microwave monitoring mode according to time and daily schedules of a person through the cloud server 4, thereby avoiding too many false alarms. When the LED lighting device 1 is in the microwave monitoring mode, a result of the microwave monitoring is valid.

Moreover, the number of the LED lighting device 1 in the LED monitoring system may be one or more, and the specific number can be increased or decreased according to actual needs.

The smart terminal 3 (also known as the terminal device) may refer to any appropriate user terminal with certain computing capabilities, such as a personal computer (PC), a work station computer, a server computer, a hand-held computing device (tablet), a smartphone or mobile phone, or any other user-side computing device. In certain embodiments, the smart terminal 3 may be a mobile terminal device, such as a smartphone, a tablet computer, or a mobile phone, etc. The smart terminal 3 may be implemented on any appropriate computing platform. The smart terminal 3 may be used by a user to connect to the wireless network and make requests to the cloud server 4.

Further, the cloud server 4 may refer to one or more server computers configured to provide certain services. The cloud server 4 may include one or more processors to execute computer programs in parallel.

Figure 2:
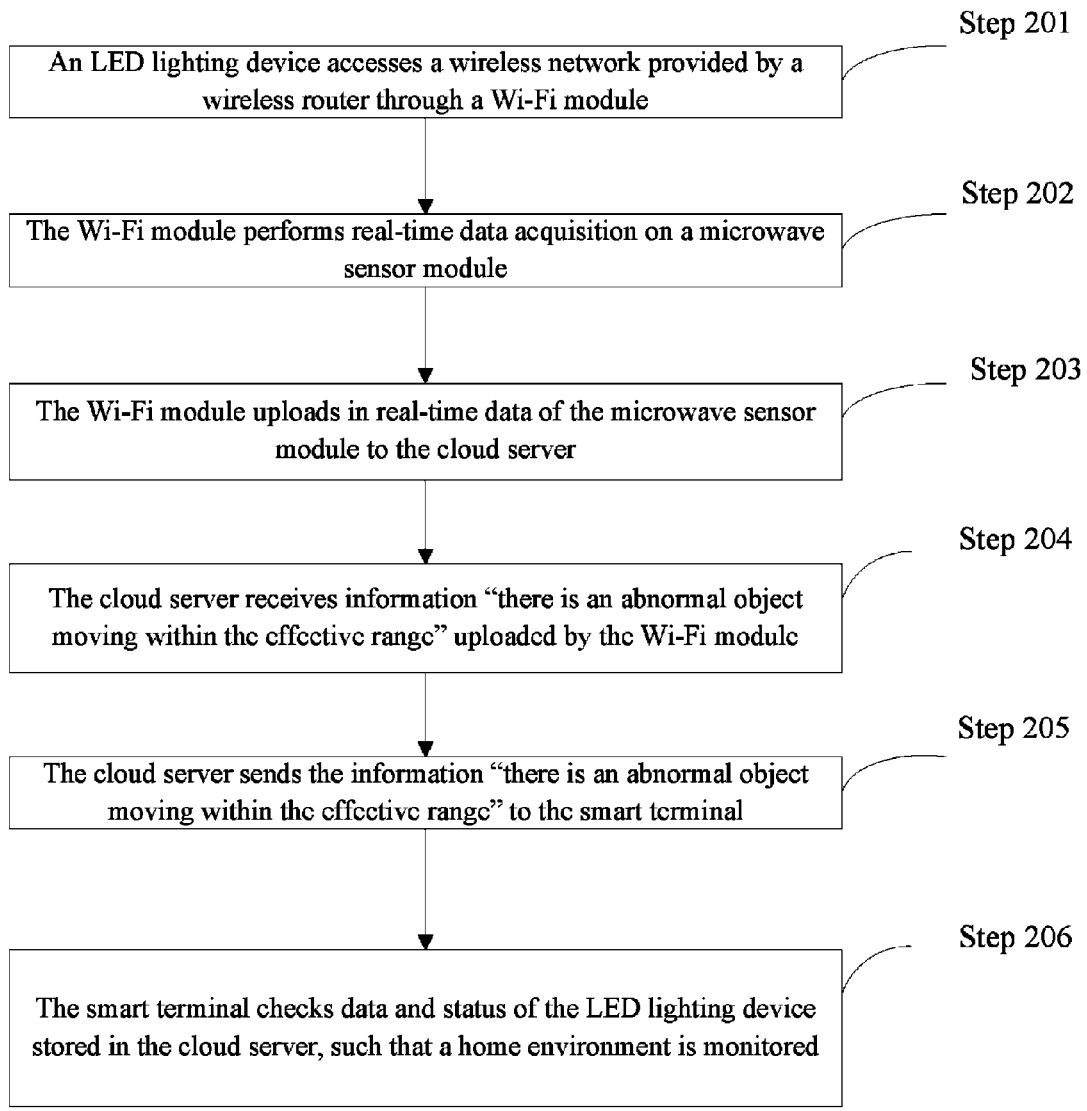
FIG. 2 illustrates a flow chart of an exemplary remote monitoring method based on an LED lighting device consistent with the disclosed embodiments.

FIG. 2 illustrates a flow chart of an exemplary remote monitoring method based on an LED lighting device consistent with the disclosed embodiments. In a search area, at least one LED lighting device is installed. The search area may be any region being monitored according to the present disclosure. Such a search area is not limited to any particular area and may include any known object therein. For example, such search areas may be indoor or outdoor, may be on the ground or in the air, etc. Various illustrative examples of search areas may include defined areas such as a room, a parking garage, a parking lot, a lobby, a bank, a playground, a pedestrian mall, etc. The number of the LED lighting device in the LED monitoring system may be one or more, and the specific number of the LED lighting device can be set according to actual needs. A Wi-Fi module and a microwave sensor module may be integrated into the LED lighting device, and the Wi-Fi module and the microwave sensor module are electrically connected. The Wi-Fi module and the microwave sensor module may be designed so that the shapes of the modules conform to the shape of the LED lighting device. In addition, the remote monitoring system also includes a wireless router, a cloud server and a smart terminal. A monitoring computer program is installed in the smart terminal. The smart terminal may be directly connected to the wireless router. The smart terminal may be also connected to the Internet through a mobile network (e.g., 2G, 3G or 4G communication network). As shown in FIG. 2, the process may include the following steps.

First, the LED lighting device accesses a wireless network provided by the wireless router through the Wi-Fi module (Step 201).

Then, the Wi-Fi module performs real-time data acquisition of the data generated by the microwave sensor module (Step 202). The Wi-Fi module may perform real-time data acquisition on the microwave sensor module through a one-channel Analog to Digital Converter (ADC). The microwave sensor module can detect whether there is an object moving within an effective range. When the Wi-Fi module detects that there is an object moving within the effective range through the microwave sensor module, the Wi-Fi module controls the LED lighting device to flash at a certain frequency or give an audible alarm through a horn embedded in or linked to the LED lighting device or outside the LED lighting device until the Wi-Fi module detects that there is no object moving within the effective range.

Further, the Wi-Fi module uploads the data of the microwave sensor module to the cloud server in real time (Step 203). The Wi-Fi module may upload the data of the microwave sensor module in real time, and other data and status of the LED lighting device to the cloud server. The cloud server stores the data and status of the LED lighting device.

The cloud server may receive information such as "there is an abnormal object moving within the effective range" uploaded by the Wi-Fi module (Step 204). The cloud server may send the information "there is an abnormal object moving within the effective range of light X" to the smart terminal in real time (Step 205).

The smart terminal checks data and status of the LED lighting device stored in the cloud server, such that a home environment is monitored (Step 206). Through the Internet, an APP program installed in the smart terminal may check regularly the data and status of the one or more LED lighting devices stored in the cloud server.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In one embodiment consistent with the present disclosure, a smart home system may include a plurality of LED lighting devices with integrated Wi-Fi modules and microwave sensor modules. Each LED lighting device may be responsible for monitoring one area of a home. A user may use a smart terminal to check the data and status of the LED lighting devices stored in a cloud server. For example, LED lighting device A may monitor one area of the driveway. LED lighting device B may monitor the living room, etc. By tracking multiple LED lighting devices with integrated Wi-Fi modules and microwave sensor modules a user may monitor the movements of various areas of a home, an office, etc.

In another embodiment consistent with the present disclosure, a smart home system may include a plurality of LED lighting devices with integrated Wi-Fi modules and microwave sensor modules. The plurality of LED lighting devices may be programmed to control each other. For example, LED lighting device A may monitor one area of the driveway. LED lighting device B may monitor the living room. When LED lighting device A detects certain movements in its effective area, it may send a signal through the Wi-Fi module to turn on LED lighting device B (e.g., a light in the living room). This type of lighting setups may be implemented as an anti-theft system. In another example, LED lighting device A may monitor one area of the driveway. LED lighting device C may monitor the garage. When LED lighting device A detects certain movements in its effective area during certain time of the day (e.g., during the time occupants of the home may come home), it may send a signal through the Wi-Fi module to turn on the light in LED lighting device B (e.g., a light in the garage).

Comparing with the existing technology, a Wi-Fi module and a microwave sensor module are integrated in an LED lighting device in this disclosure. Through the Internet, a smart terminal may check regularly the data and status of the LED lighting device stored in a cloud server; or when the cloud server receives the information (e.g., "there is an abnormal object moving within the effective range") sent from the Wi-Fi module, the cloud server sends the information to the smart terminal in real time. Therefore, wireless and remote monitoring can be implemented through the smart terminal (e.g., a personal computer, a mobile phone, and so on).

REFERENCE SIGN LIST

Lighting emitting diode (LED) lighting device 1
Wireless router 2
Smart terminal 3
Cloud server 4
Wireless Fidelity (Wi-Fi) module 13
Microwave sensor module 14

What is claimed is:

1. A system for remote monitoring based on a lighting emitting diode (LED) lighting device, comprising:
   a smart terminal configured to check data from an LED lighting device stored in a cloud server;
   a wireless router configured to provide a wireless network;
   the LED lighting device including a Wireless Fidelity (Wi-Fi) module and a microwave sensor module, wherein:
      the Wi-Fi module is configured to connect the LED lighting device to the wireless network provided, perform real-time data acquisition on the microwave sensor module, and upload the acquired data to the cloud server in real time; and
      the microwave sensor module is configured to detect an object movement within an effective range; and
   the cloud server configured to receive information about an abnormal object movement within the effective range sent from the Wi-Fi module, and send the received information to the smart terminal in real time,
   wherein the LED lighting device is set to one of a microwave monitoring mode and a non-microwave monitoring mode according to a time and daily schedule of a person through the cloud server;
   when the LED lighting device is in the microwave monitoring mode, a result of microwave monitoring is valid; and
   when the LED lighting device is in the non-microwave monitoring mode, the microwave monitoring is invalid.

2. The system according to claim 1, wherein:
   the smart terminal is connected to the Internet through the wireless router; and
   the cloud server sends the received information to the smart terminal through the Internet.

3. The system according to claim 1, wherein:
   the smart terminal is connected to the Internet through a mobile network; and
   the cloud server sends the received information to the smart terminal through the Internet.

4. The system according to claim 1, wherein:
   when it is detected that there is an object moving in the effective range, the remote monitoring system controls the LED lighting device to give at least one alarm until no object movement within the effective range is detected, the alarm including a flashing alarm at a certain frequency, an audible alarm through a horn embedded in the LED lighting device, and an audible alarm through a horn set outside the LED lighting device.

5. The system according to claim 1, wherein:
   a communication interface between the microwave sensor module and the Wi-Fi module is one of analog to digital converter (ADC), inter-integrated circuit (I2C), universal asynchronous receiver transmitter (UART), and general purpose input/output (GPIO).

6. The system according to claim 1, wherein:
the Wi-Fi module performs real-time data acquisition on the microwave sensor module through a one-channel ADC.

7. A method for remote monitoring based on an LED lighting device, comprising:
connecting a LED lighting device to a wireless network provided by a wireless router;
acquiring real-time data from a microwave sensor module integrated into the LED lighting device;
uploading the acquired data of the microwave sensor module to a cloud server in real time;
sending the received information to a smart terminal when information about an abnormal object movement within an effective range uploaded by a Wi-Fi module is received; and
setting the LED lighting device to one of a microwave monitoring mode and a non-microwave monitoring mode according to a time and daily schedule of a person through the cloud server;
wherein when the LED lighting device is in the microwave monitoring mode, a result of microwave monitoring is valid; and
when the LED lighting device is in the non-microwave monitoring mode, the microwave monitoring is invalid.

8. The method according to claim 7, wherein:
the smart terminal is connected to the Internet through the wireless router; and
the cloud server sends the received information to the smart terminal through the Internet.

9. The method according to claim 7, wherein:
the smart terminal is connected to the Internet through a mobile network; and
the cloud server sends the received information to the smart terminal through mobile network.

10. The method according to claim 7, wherein:
when it is detected that there is an object moving in the effective range, the remote monitoring system controls the LED lighting device to give at least one alarm until no object movement within the effective range is detected, the alarm including a flashing alarm at a certain frequency, an audible alarm through a horn embedded in the LED lighting device, and an audible alarm through a horn set outside the LED lighting device.

11. The method according to claim 7, wherein:
a communication interface between the microwave sensor module and the Wi-Fi module is one of analog to digital converter (ADC), inter-integrated circuit (I2C), universal asynchronous receiver transmitter (UART), and general purpose input/output (GPIO).

12. The method according to claim 7, wherein:
the Wi-Fi module performs real-time data acquisition on the microwave sensor module through a one-channel ADC.

13. A method for remote monitoring based on an LED lighting device, comprising:
connecting a LED lighting device to a wireless network provided by a wireless router;
acquiring real-time data from a microwave sensor module integrated into the LED lighting device;
uploading the acquired data of the microwave sensor module to a cloud server in real time;
sending the received information to a smart terminal when information about an abnormal object moving within an effective range uploaded by a Wi-Fi module is received; and
receiving data from the smart terminal controlling the LED lighting device,
wherein the LED lighting device is set to one of a microwave monitoring mode and a non-microwave monitoring mode according to a time and daily schedule of a person through the cloud server;
when the LED lighting device is in the microwave monitoring mode, a result of microwave monitoring is valid; and
when the LED lighting device is in the non-microwave monitoring mode, the microwave monitoring is invalid.

14. The method according to claim 13, wherein:
the smart terminal sends data turning an alarm associated with the LED lighting device on or off.

15. The system according to claim 1, further comprising:
multiple LED lighting devices including a first LED lighting device and a second LED lighting device, each including the Wi-Fi module and the microwave sensor module, wherein
the first LED lighting device and the second LED lighting device are located in different areas;
the Wi-Fi module of the first LED lighting device is configured to, when the microwave sensor of the first LED lighting device detects the object movement within the effective range during a pre-set time period of the day, send a signal to turn on the second LED lighting device for lighting.

16. The system according to claim 1, wherein
the smart terminal is installed with an application program to check data in the cloud server; and
the application program on the smart terminal is further configured to regularly check status of the LED lighting device stored in the cloud server.

* * * * *